United States Patent
Saito et al.

[11] Patent Number: 5,455,696
[45] Date of Patent: Oct. 3, 1995

[54] DISPLAY APPARATUS INCLUDING A LIQUID AND TWO PLATES BONDED TOGETHER BY A FLUOROCARBON RESIN

[75] Inventors: Susumu Saito; Takashi Takahashi, both of Tokyo, Japan

[73] Assignee: Kabushiki Kaisha Topcon, Japan

[21] Appl. No.: 87,365

[22] Filed: Jul. 8, 1993

Related U.S. Application Data

[63] Continuation-in-part of Ser. No. 85,950, Jul. 6, 1993.

[30] Foreign Application Priority Data

Jul. 10, 1992 [JP] Japan ................................. 4-206145
Jun. 21, 1993 [JP] Japan ................................. 5-172132

[51] Int. Cl.$^6$ ........................... G02F 1/1339; G01C 9/28
[52] U.S. Cl. ........................................ 359/80; 33/379
[58] Field of Search ........................... 359/80; 33/379; 428/421, 422

[56] References Cited

U.S. PATENT DOCUMENTS

| | | | |
|---|---|---|---|
| 2,968,649 | 1/1961 | Pailthorp et al. | 260/80.5 |
| 3,990,781 | 11/1976 | Gum | 350/160 |
| 4,470,668 | 9/1984 | Inoue et al. | 350/343 |
| 4,521,974 | 6/1985 | Neis et al. | 33/379 |
| 4,647,157 | 3/1987 | Chiklis | 350/343 |
| 4,820,025 | 4/1989 | Nakanowari | 350/343 |
| 4,979,310 | 12/1990 | Wright | 33/379 |
| 5,121,234 | 6/1992 | Kucera | 359/50 |
| 5,272,816 | 12/1993 | Fujiwara | 33/379 |

*Primary Examiner*—Anita Pellman Gross
*Assistant Examiner*—Charles Miller
*Attorney, Agent, or Firm*—Lorusso & Loud

[57] ABSTRACT

A display apparatus has two plates and an intermediate member disposed between the two plates. The two plates are bonded by way of the intermediate member. A liquid is sealed in a gap or space defined by the plates and the intermediate member. The two plates are bonded by means of a fluorocarbon resin having terminal alkoxide groups or a fluorine-containing resin having terminal alkoxide groups.

8 Claims, 5 Drawing Sheets

DISPLAY APPARATUS INCLUDING A LIQUID AND TWO PLATES BONDED TOGETHER BY A FLUOROCARBON RESIN

CROSS-REFERENCE TO RELATED APPLICATION

This application is a Continuation-in-Part of applicants' application U.S. Ser. No. 08/085,950, filed Jul. 6, 1993, pending, and entitled "A DISPLAY APPARATUS AND A METHOD FOR MAKING THE SAME" (Attorney Docket No. TAN-A975).

BACKGROUND OF THE INVENTION

This invention relates to a display apparatus and a method for making the same. In particular, this invention relates to a bubble type display apparatus for use as an inclination angle measuring device in which a liquid and a bubble are sealed in a container so that the bubble is allowed to move depending on the angle of inclination of the container and to a method for making the same. Also, this invention relates to a liquid crystal type display apparatus in which a liquid crystal is sealed between two base plates equipped with electrodes and a method for making same.

PRIOR ART

A circular bubble tube or bar-shaped bubble tube type display apparatus is known as an inclination angle measuring device in which a liquid and a bubble are sealed in a tube-like container so that the bubble is allowed to move depending on the angle of inclination of the container. Such bubble tube type display apparatuses include a bubble tube constituted, for example, of a tube-shaped container and a top plate. The top plate is a disk-shaped glass plate whose inner surface is made concave at a given curvature. The sensitivity of the bubble tube is determined by the curvature. In general, the sensitivity, S, of the bubble tube is indicated in the following manner. For instance, when the distance of movement of the bubble is taken as X, the radius of curvature of the concave surface as R and the angle of inclination of the bubble tube as T, the relationship of X/R=tan T should be established. In the case where X is 1 mm and T is 2, R is calculated from 1 (mm)/R (mm)=tan 2. Thus, R is equal to approximately 1719 mm. The curvature radius of the concave surface is determined as such.

The container and the top plate are usually fusion-bonded with a low melting glass. Subsequently, an appropriate amount of a liquid is charged into the container through a port and the port is then sealed. A wide variety of liquids are used for this purpose, including alcohols, ethers and mixtures thereof. For the fusion bonding between the container and the top plate, it is necessary to heat them up to at least approximately 550° C.

Also, there is known a bubble tube of the type wherein the behavior of the bubble is electrooptically read. In such a type of bubble tube, light is applied from the lower side of the bubble tube. The angle of inclination is detected by measuring a variation in quantity of the light accompanied by the movement of the bubble by means of a detector. In this type of bubble tube, a charging port is provided at a side of the container, and the bottom of the container is closed with a bottom plate. In this case, the container and the top plate and the container and the bottom plate are, respectively, fusion-bonded with a low melting glass.

In the above-described conventional bubble tubes, in which the top and bottom plates are fusion-bonded to the container, the concave surface of the top plate suffers deformation by application of heat. Consequently, bubble tubes with high precision could not be obtained.

Conventional liquid crystal type display apparatuses include two base plates between which a liquid crystal is sealed. Thermosetting type ultraviolet hardening type sealing materials are used as an intermediate member for sealing. In the case of the thermosetting type sealing materials, the intermediate member is pressed between and by the two base plates while it is heated, whereby the intermediate member is hardened so as to bond the base plates. In the case of the ultraviolet hardening type sealing materials, the intermediate member is hardened by illuminating with ultraviolet light through the two base plates, so as to form a bond through the intermediate member.

However, in the case of the thermosetting type sealing materials, the intermediate member must be heated at a high temperature between 100° C. and 200° C. When it is cooled, some thermal strain will remain.

In the case of the ultraviolet hardening type sealing materials, the intermediate member is apt to be dissolved by the liquid crystal sealed in the container. Thus, life time is shortened.

In the prior art display apparatuses, for instance, liquid crystal type display apparatuses, the difference of solubility parameter between liquid crystals, such as thermotropic or lyotropic liquid crystals, and the conventional ultraviolet hardening type sealing materials ranges between 0.2 $[cal/cm^3]^{1/2}$ and 5.5 $[cal/cm^3]^{1/2}$. Their mutual solubility is so large that they are apt to be dissolved.

SUMMARY OF THE INVENTION

It is an object of the present invention to provide a liquid crystal type display apparatus and a method of making the same in which the seal is not substantially affected by liquid crystals such as thermotropic or lyotropic liquid crystals, high heat or ultraviolet light so that leakage due to secular change can be avoided so as to increase the reliability of the seal.

It is another object of the present invention to provide a bubble type display apparatus and a method of making it in which high precision can be obtained without limitation of the type of liquid being sealed and with which satisfactory airtightness can be maintained.

According to the present invention, a display apparatus comprises two plates and an intermediate member disposed between the two plates. The two plates are bonded by the intermediate member. A liquid is sealed in a gap or space defined by the plates and the intermediate member. In one mode of the present invention, for instance, in case the display apparatus is a liquid crystal type display apparatus, the intermediate member itself functions as an adhesive for bonding the two plates. In this case, it is not necessary to provide any other intermediate member although such an additional member can be provided, if desired, within the scope of the present invention. In another embodiment of the present invention, for instance, the display apparatus is a bubble type display apparatus or an inclination angle measuring apparatus, the intermediate member is a container, and an adhesive is disposed between the plate and at least one open end of the container. In any case, a fluorocarbon resin having an alkoxide group or a fluorine-containing resin having an alkoxide group is used for bonding. The alkoxide groups of such resins are reactive, e.g. with water in a hydrolysis reaction.

Because the fluorocarbon or fluorine-containing resin can be hardened at room temperature, the plates can be bonded without adverse affect due to heat. In addition, the liquid crystal is not chemically affected by the fluorocarbon resin over a long period of time in a liquid crystal type display apparatus. For example, the difference of solubility parameter between the liquid crystal and the fluorocarbon resin is approximately from 6 $[cal/cm^3]^{1/2}$ to 9 $[cal/cm^3]^{1/2}$. Thus, the solubility of the fluorocarbon resin to the liquid crystal is extremely small so that the fluorocarbon resin is not dissolved by the liquid crystal. Therefore, the plate can be bonded with precision. Good bonding can be maintained without leakage for a long period of time so that sealing reliability can be increased.

Good sealing can be obtained regardless of the type of liquid sealed therein. Because the plate can be bonded without thermal strain, a high precision can be obtained. Any liquid crystal type display apparatus can be freely designed and produced by simple production steps.

According to a preferred embodiment of the present invention, a display apparatus includes two plates, an intermediate member disposed between the two plates, means for bonding the plates by way of an intermediate member, a liquid sealed in a gap or space defined by the plates and the intermediate member, the bonding means being an adhesive of a fluorocarbon or fluorine-containing resin having reactive alkoxide groups.

The present invention also provides a method of making a display apparatus including bonding two plates by means of the fluorocarbon or fluorine-containing resin while an intermediate member is disposed between said two plates, and thereafter charging a liquid into a space defined by said plates and said intermediate member.

According to another embodiment of the present invention, a bubble type display apparatus comprises a container having two open ends, a first member for closing one open end of said container, and a second member for closing the other open end of said container, said container being filled with a liquid with a bubble so that said bubble is moveable depending on the angle of inclination of said container. The container and the first member are bonded with a fluorocarbon resin having a reactive alkoxide group, while the container and the second member are also bonded with a fluorocarbon resin or fluorine-containing resin having a reactive alkoxide group.

According to still another embodiment of the present invention, a method for making a bubble type display apparatus includes, as a first step, closing one of two open ends of a container with a first member, a second step of closing the other open end of the container with a second member, and a third step of filling a liquid and a bubble in the container. The container and the first member are bonded in the first step with a fluorocarbon resin having a reactive alkoxide group. The container and the second member are bonded in the second step with a fluorocarbon or fluorine-containing resin having a reactive alkoxide group.

According to a further embodiment of the present invention, a liquid crystal type display apparatus includes two base plates equipped with electrodes, a gap formed between the two base plates, an intermediate member for bonding the two base plates, a liquid crystal sealed in the gap between the two base plates, the intermediate member being made of the fluorine-containing resin or fluorocarbon resin.

In another embodiment of the present invention a method is provided for making the liquid crystal type display apparatus, wherein a liquid crystal is sealed between two base plates equipped with electrodes, including the steps of bonding the two base plates by means of the fluorocarbon resin or fluorine-containing resin, and thereafter charging a liquid crystal into a gap between the two base plates.

A further embodiment of the present invention provides a method for making a liquid crystal type display apparatus wherein a liquid crystal is sealed between two base plates equipped with electrodes, which method includes the steps of providing the fluorocarbon resin or fluorine-containing resin onto one of the two base plates as an intermediate member for sealing, superposing said two base plates so as to leave a gap therebetween, bonding the two base plates by way of the intermediate member, and charging a liquid crystal into the gap between the two base plates.

The fluorocarbon resin or fluorine-containing resin in all embodiments of the present invention is characterized by the presence of alkoxide functional groups.

BRIEF DESCRIPTION OF THE DRAWINGS

Plural preferred embodiments of the present invention will be explained with reference to the accompanying drawings in which.

DESCRIPTION OF THE PREFERRED EMBODIMENT

A first embodiment of the present invention will be explained referring to FIGS. 1 and 2.

Figure 1:
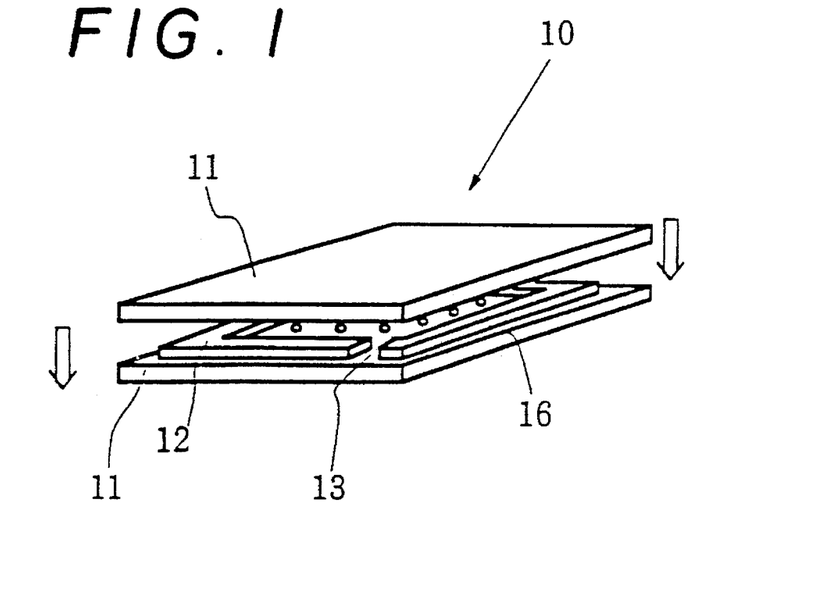
FIG. 1 is a schematic view of a liquid crystal type display apparatus according to the present invention.

A liquid crystal type display apparatus 10 for a picture image display is assembled as schematically shown in FIG. 1.

In a well-known manner, two base plates 11 are equipped with plural electrodes. Also, picture elements for the picture image display and thin film transistors constituting switching elements are formed on a surface of the base plates 11 by means of photolithography or the like. Electrodes for image signal scanning or signal output purposes are arranged along the peripheral edge of a scope of the liquid crystal type display apparatus. Also, orientation films are provided so as to cover the scope. They are not shown for purposes of simplification.

In FIG. 1, a sealing intermediate member 12 made of a fluorocarbon resin containing active alkoxide groups or a fluorine-containing resin with reactive alkoxide groups is arranged on a surface of one of the base plates 11 in a predetermined pattern. The sealing intermediate member 11 has a port 13 for charging a liquid crystal therethrough. A number of conventional spacers 16 are placed between the base plates 11 within the sealing intermediate member 12. The spacers 16 have a predetermined size such that the base plates 11 can be held apart a desired distance so as to form a gap or space 14.

The base plates 11 are pressed in the directions of the arrows in order to bond the base plates 11 as shown in FIG. 1.

Figure 2:
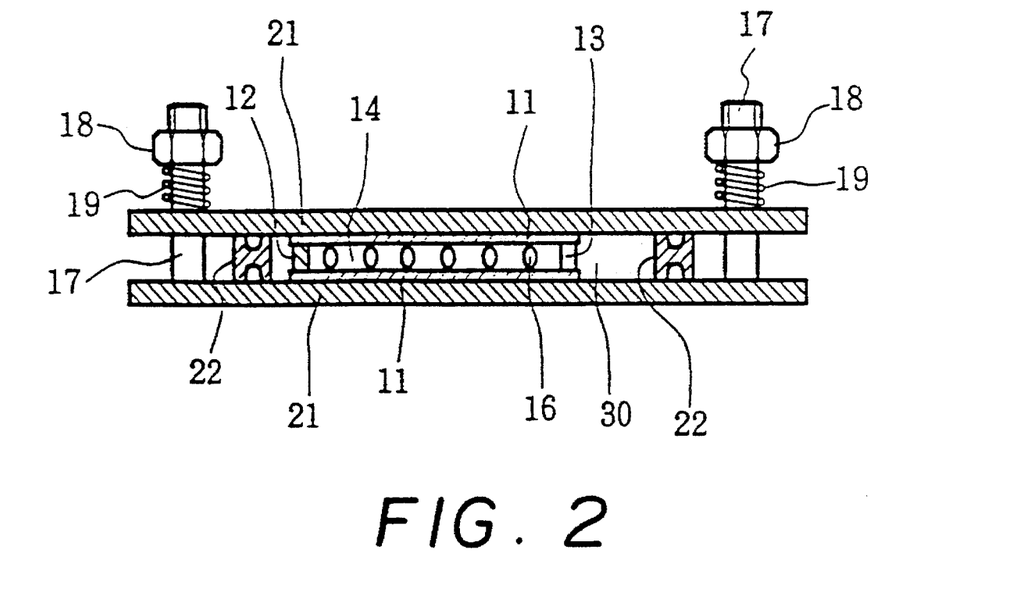
FIG. 2 is a sectional view schematically showing a method for making the liquid crystal type display apparatus shown in FIG. 1 according to a first embodiment of the present invention.

Referring to FIG. 2, a method of producing the liquid crystal type display apparatus of FIG. 1 will be explained by way of example.

Two base plates 11 are aligned with precision so as to be superposed with a gap while the sealing intermediate member 12 is placed between them. The base plates 11 are held between two holding plates 21 made of a stainless steel. The holding plates 21 are larger in size than the base plates 11. A rectangular ring of elastic or resilient member 22 is positioned along the peripheral edge of the holding plates 21 and held between the holding plates 21 in a sealing manner. The base plates 11 are enclosed by the resilient member 22. A space or gap 30 defined by the two holding plates 21 and the resilient member 22 is sealed.

When the two base plates 11 are in a superposed condition, a pressure is equally applied to the two base plates 11 by clamping means or the like so that they are bonded by way of the sealing intermediate member 12. For instance, as shown in FIG. 2, the holding plates 21 are clamped by means of plural supporting bolts 17 and nuts 18 together with compression springs 19 so as to press the base plates 11 toward each other while the spacers 16 are disposed between them. In such a condition, the fluorocarbon resin or fluorine-containing resin with reactive alkoxide groups, forming the sealing intermediate member 12, is hardened at room temperature.

By evacuating a chamber in which the two base plates 11 and the sealing intermediate member 12 are arranged as shown in FIG. 2, the pressure in the gap or space 14 is decreased so that a liquid crystal such as a thermotropic or lyotropic liquid crystal, may be more readily charged into the gap 14 by way of the port 13.

Figure 5:
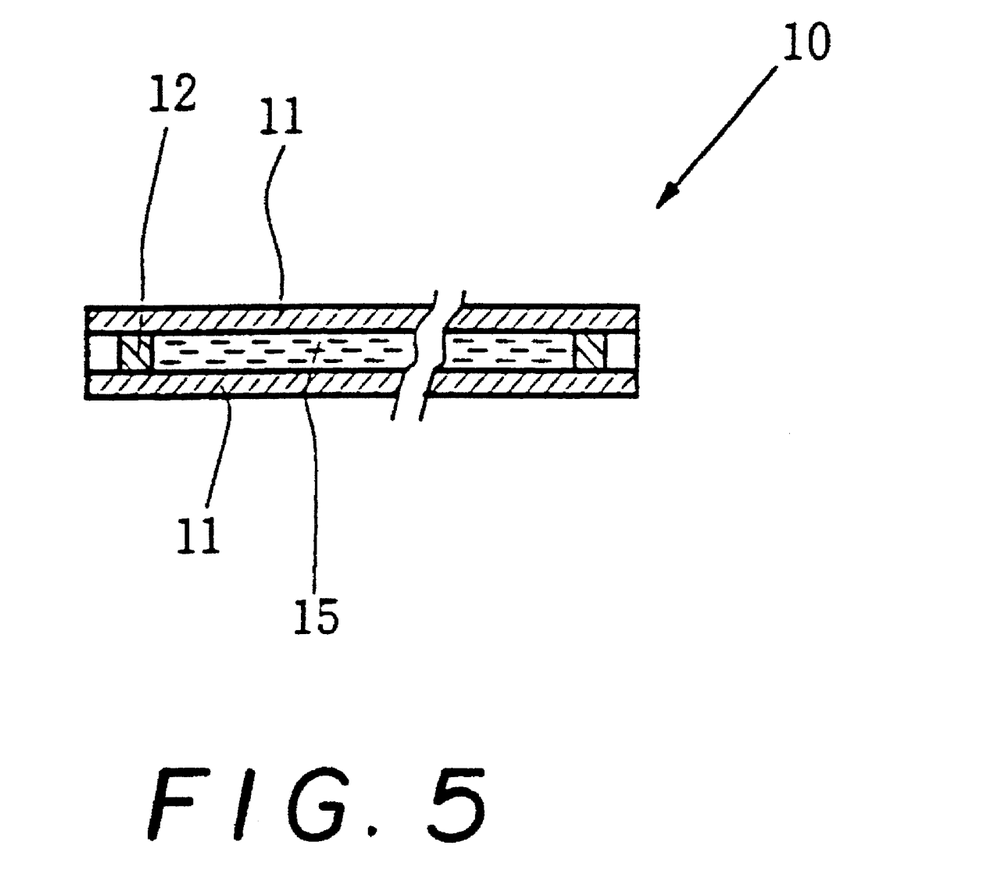
FIG. 5 is a sectional view schematically showing the completely assembled liquid crystal type display apparatus of FIG. 1.

When the gap 14 becomes filled with the liquid crystal, a sealing element made of the fluorocarbon resin or fluorine-containing resin is set in the port 13 so as to close it whereby the liquid crystal is sealed within the space 14. As a result, a liquid crystal type display apparatus 10 as shown in FIG. 5 can be obtained.

Figure 3:
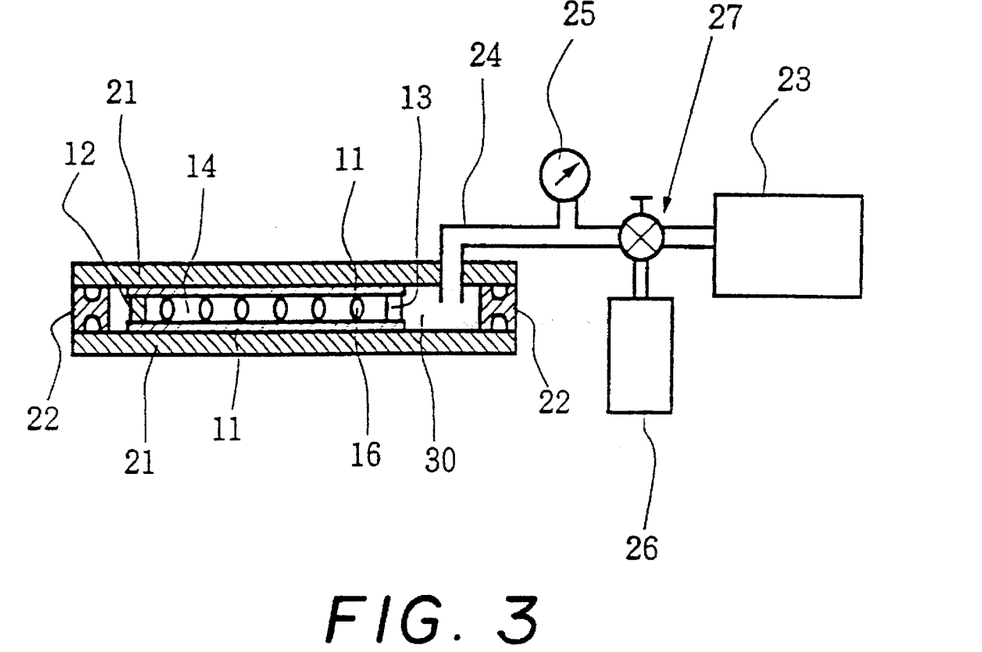
FIG. 3 is a sectional view schematically showing a method for making the liquid crystal type display apparatus shown in FIG. 1 according to a second embodiment of the present invention.

With reference to FIG. 3, a further method of producing the liquid crystal type display apparatus will be explained.

Two base plates 11 are aligned with precision so as to be superposed with a gap while the sealing intermediate member 12 is placed between them. The base plates 11 are held between two holding plates 21 made of a stainless steel. The holding plates 21 are larger than the base plates 11. A rectangular ring of elastic or resilient member 22 is positioned along the peripheral edge of the holding plates 21 and held between the holding plates 21 in a sealing manner. The base plates 11 are enclosed by the resilient member 22. A space or gap 30 defined by the two holding plates 21 and the resilient member 22 is sealed.

One end of a tube or pipe 24 is connected to the space 30, and the other end of the tube 24 is connected to a vacuum pump 23 equipped with a controller. A pressure gage 25 is placed at an intermediate portion of the tube 24 so as to detect pressure in the tube 24. A valve 27 is also provided at an intermediate portion of the tube 24 between the gage 25 and the vacuum pump 23 and connected to a liquid crystal supply source 26.

In operation, the valve 27 is adjusted to connect the space 30 with the vacuum pump 23. When the vacuum pump 23 starts, the pressure in the space 30 is reduced, and then the holding plates 21 are pressed by means of the atmospheric pressure. Thus, the base plates 11 are equally pressed until the gap or space 14 is adjusted so as to have a predetermined width or distance such as 5 microns corresponding to the size of the spacers 16. In such a condition, the distance between the holding plates is adjusted to about 2.2 mm, for instance.

While the space 14 is in a vacuum, the sealing intermediate member 12 made of a soluble fluorocarbon resin is hardened at room temperature. As a result, the two base plates 11 are bonded by way of the sealing intermediate member 12 in a sealed manner.

Next, the valve 27 is opened or reset in another position so as to connect the space 30 with the liquid crystal supply source 26. Because the space 14 is in a vacuum, liquid crystal is automatically fed from the liquid crystal supply source 26 into the space 14 by way of the tube 24, the space 30 and the port 13.

In another mode, the space 14 can be filled with liquid crystal by immersing the two base plates 11 into a liquid crystal container.

After the space 14 becomes filled with the liquid crystal, a sealing element is set in the port 13 so as to close the port 13 whereby the liquid crystal is sealed to obtain the crystal type display apparatus of FIG. 5.

During the evacuating step, the space 14 and the space or chamber 30 are equally evacuated because they are connected by way of the port 13 of the sealing intermediate member 12. The base plates 11 are pressed together due to the negative or reduced pressure while the intermediate member 12 is disposed between them. In this condition, no air remains within the space 14 sealed between the base plates 11 and the intermediate member 12. Therefore, the base plates 11 can be properly bonded to the intermediate member 12 without any air therebetween.

Figure 4:
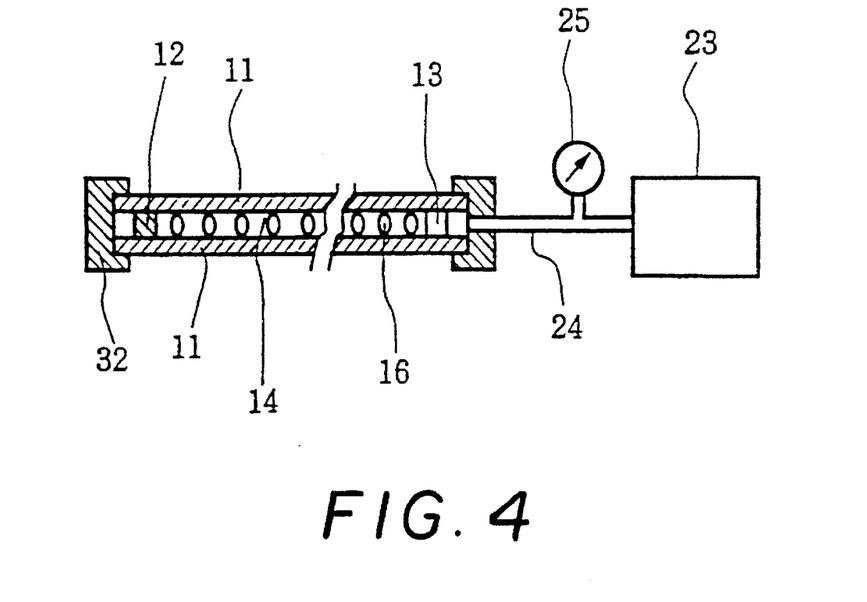
FIG. 4 is a sectional view schematically showing a third embodiment of the assembling method of the present invention.

With reference to FIG. 4, another method of producing the liquid crystal type display apparatus will be explained.

In the embodiment of FIG. 4, an elastic or resilient member 32 encloses the outer periphery of two base plates 11 between which many spacers 16 are placed within a ring-shaped sealing intermediate member 12 so as to define a predetermined distance between the two base plates 11. It is important that the inner periphery of the elastic member 32 engages the outer periphery of the base plates 11 in a sealing manner. One end of a tube 24 is inserted into an opening in the elastic member 32 and positioned near a port 13 formed in the sealing intermediate member 12. The other end of the tube 24 is connected to a vacuum pump 23. A pressure gage 25 is placed at an intermediate portion of the tube 24. When the vacuum pump 23 starts, the space 14 is evacuated. As a result, the base plates 11 are pressed together by the atmospheric pressure. For instance, a maximum pressure of about 1 kgf/cm² can be applied onto the outer surface of the base plates 11. In this condition, the two base plates 11 are maintained spaced a predetermined distance apart by means of the spacers 16.

In the embodiment of FIG. 4, because the base plates 11 are bonded by way of the sealing intermediate member 12 under a negative or reduced pressure, no air remains in the sealed space 14 between the base plates 11 and the intermediate member 12 so as to obtain excellent sealing.

In particular, the embodiment of FIG. 4 is preferred for producing a large size liquid crystal type display apparatus. In order to increase production efficiency, first, a very large liquid crystal type display apparatus is formed, and thereafter it is cut into a plurality of small liquid crystal type display apparatuses, each having a desired small size.

FIG. 5 shows the liquid crystal type display apparatus produced by the methods shown in FIGS. 2 to 4. Reference numeral 15 designates the liquid crystal which fills the space 14. Substantially no air remains in the sealed space between the base plates 11 and the intermediate member 12.

In the above-described embodiments of the present invention, the fluorocarbon resin or fluorine-containing resin has an adhesive functional group which provides a bonding force of several $10^2$ kg through formation of covalent bonds, which adhesive force can break glass by means of tensile force. By contrast, an epoxy resin adhesive which is conventionally used in a liquid crystal type display apparatus has only a bonding force of several 10 kg. Further, an epoxy resin adhesive is apt to be gradually dissolved by the liquid crystal sealed in the display apparatus so that good sealing cannot be maintained for a long period of time.

A preferred "fluorocarbon resin or fluorine-containing resin" for use in the present invention is:

$$(OR)_3SiOF_2C{+}CF_2CF_2{\;}_n CF_2OSi(OR)_2$$

wherein R is an alkyl group.

The hardening of the above fluorine-containing resin proceeds at room temperature in two stages as follows:

The alcohol is evaporated off and the product A of the above hydrolysis reaction is hardened by polycondensation as follows:

In the embodiments of FIGS. 3 and 4, because the base plates 11 are bonded while the space 11 therebetween is evacuated, no air remains at the joints thereof so that excellent sealing and bonding can be obtained. Also, because the base plates 11 are uniformly pressed by means of atmospheric pressure, mechanical strain can be reduced to a minimum, and the base plates can be bonded with precision. Accordingly, a high quality of display apparatus can be produced.

The embodiment of FIG. 4 is preferable for a method of producing a large size liquid crystal display apparatus with a high quality and a high efficiency.

The present invention is not limited to the above-stated embodiments only. For example, a plurality of base plates can be placed in a parallel or series between two holding plates 21 so as to form a plurality of liquid crystal display apparatuses at the same time.

Figure 6:
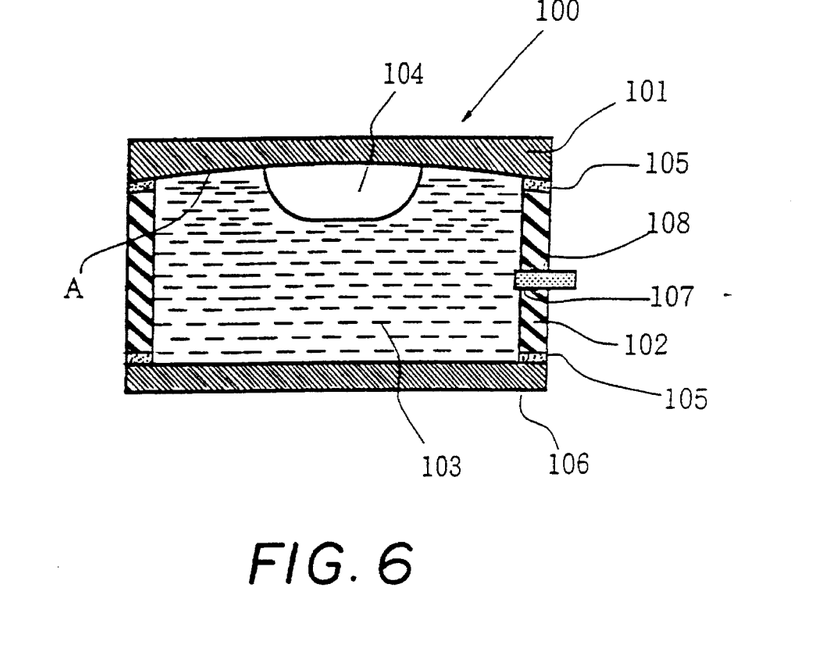
FIG. 6 is a sectional view showing a bubble tube type display apparatus according to another embodiment of the invention.
Figure 7:
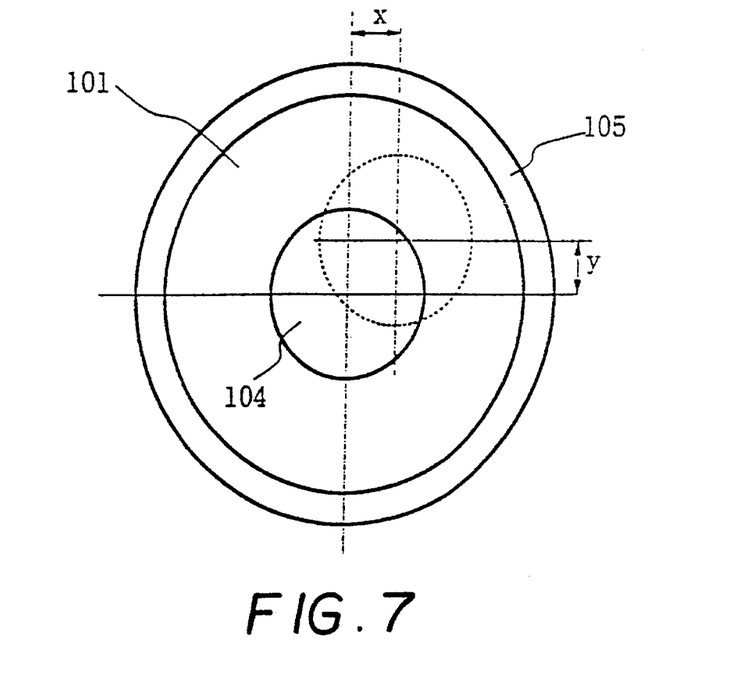
FIG. 7 is a top view of the bubble tube type display apparatus of FIG. 6.

A fourth embodiment of the present invention will be explained with reference to FIGS. 6 and 7. FIG. 6 is a sectional view of a bubble type display apparatus according to a preferred embodiment, and FIG. 7 is a top view thereof.

A bubble tube 100 is formed of a top plate 101, a container 102 and a bottom plate 106. The top plate 101 is made of a glass disk which has a flat outer surface. An inner surface A is concave with a predetermined curvature radius. The container 102 is made of a metal cylinder such as, for example, a stainless steel cylinder. The bottom plate is also made of a glass disk similar to the top plate and has both flat inner and outer surfaces. The container 102 has a small through-hole 107 at one side thereof in order to permit a liquid 103 to be poured therethrough. The small through-hole 107 has, for example, a diameter of about 1 mm.

The top plate 101 is bonded to the container 102 at one end thereof and the bottom plate 106 is likewise bonded to the container 102 at the other end, both through a solvent-soluble fluorocarbon resin 105 having a reactive alkoxide group which serves as an adhesive functional group. After completion of the bonding, a predetermined amount of the liquid 103 is poured through the small through-hole 107 so that an appropriate size bubble 104 is left in the container. Subsequently, the through-hole 107 is plugged with a tapered pin 108. Thus, a bubble tube type display apparatus 100 is obtained.

The liquid 103 to be poured is preferably a mixture of methanol which is a highly polar alcohol and diethyl ether which is a solvent, or a saturated hydrocarbon solvent, typical of which is n-hexane.

A mixture of an alcohol and an ether is placed in the container and subjected to an airtightness test at a high temperature of, for example 60° C. As a result, it is recognized that the airtightness can be maintained over one year or longer even at a high temperature of 60° C.

For comparison, an epoxy resin is used, in place of the soluble fluorine resin, for bonding between the container and the top and bottom plates, thereby obtaining a bubble tube for comparison. When this bubble tube is kept at 60° C., the airtightness is lost in about one week.

In the fourth embodiment of the invention, the bonding is made using the soluble fluorocarbon resin having an adhesive functional group. As a result, a covalent bond with a bonding force of several hundreds kilograms is formed, thus ensuring such a long life as set out above. The bonding force is so great that, when the bonded glass is pulled, it is broken. In contrast, with the bonding through the epoxy resin used for comparison, the bonding is made through an intramolecular force of only several kilograms. Accordingly, the airtightness cannot be kept over a long time.

A fifth embodiment of the invention will be described with reference to FIGS. 8 and 9.

Figure 8:
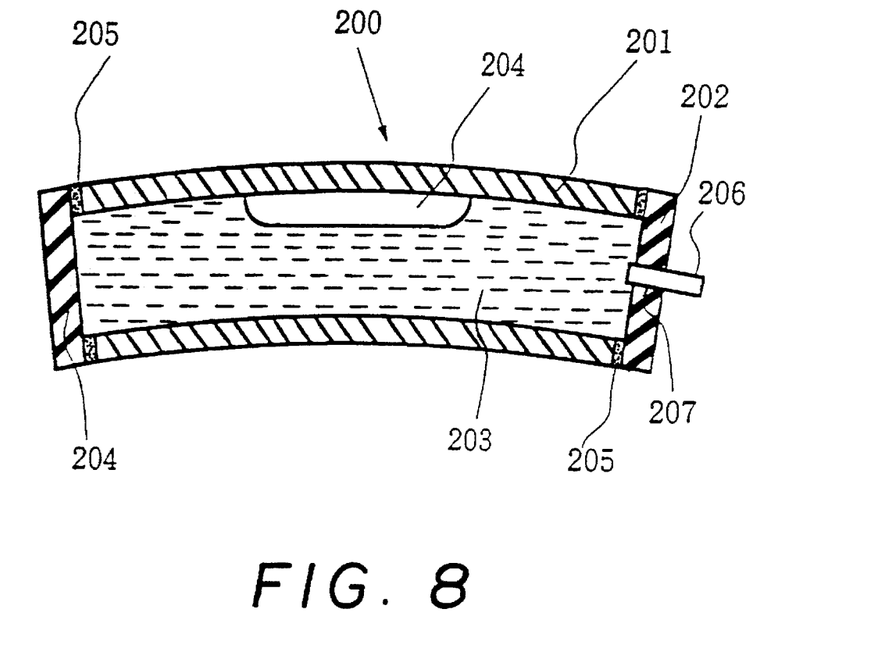
FIG. 8 is a sectional view showing a bubble tube type display apparatus according to yet another embodiment of the invention.
Figure 9:
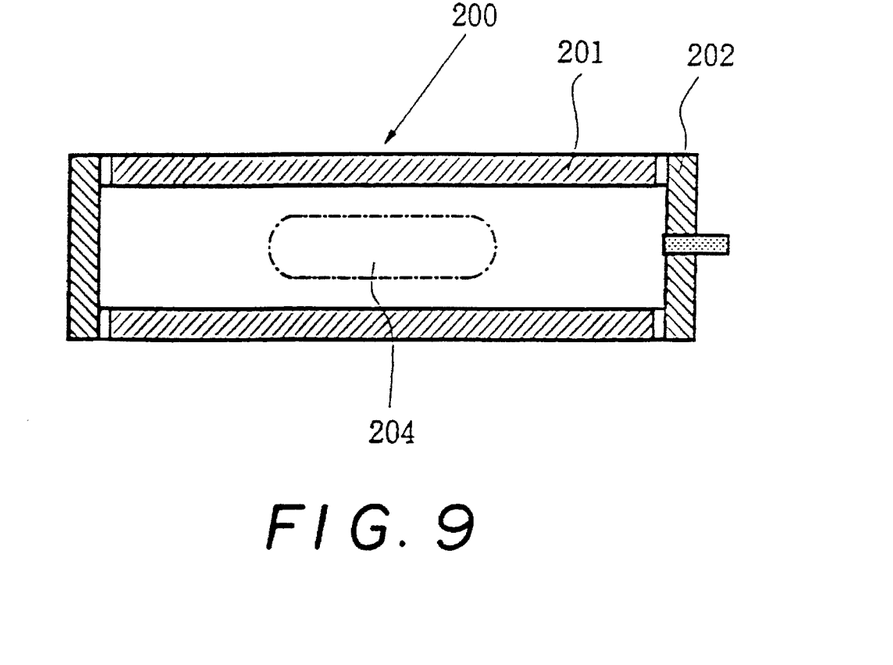
FIG. 9 is a top view of the bubble tube type display apparatus of FIG. 8.

In the embodiment of FIGS. 8 and 9, a container 201 is in the form of an elongated pipe and is slightly curved overall. The container 201 is made of glass. The container 201 has disk-shaped side plates 202, 204 bonded at opposite sides of the container 201 with a soluble fluorocarbon resin 205. A small through-hole 207 is formed at one side plate 202. The side plates 202, 204 are made of a stainless steel. Otherwise, the fifth embodiment is similar to that of the bubble tube type display apparatus 100.

In a bubble tube type display apparatus according to the above-described embodiments of the invention, the container and the first and second members are bonded with a soluble fluorocarbon resin, so that satisfactory airtightness is ensured irrespective of the type of liquid contained therein. In addition, the resultant bubble tube can have high precision.

In a method for making a bubble tube type display apparatus according to the above-described embodiments of the invention, the container and the first and second members are bonded in the first and second steps by means of a soluble fluorocarbon resin. Accordingly, little limitation is placed on the type of liquid introduced therein, resulting in a greater freedom in fabrication of the bubble tube. Thus, a bubble tube with high precision can be made by a simple procedure.

What is claimed is:

1. A display apparatus comprising:

two plates;

an intermediate member disposed between said two plates to define a gap between said two plates and to define, in cooperation with said two plates, an interior space;

a liquid sealed within said interior space; and an adhesive comprising fluorocarbon resin of the formula:

wherein R is an alkyl group, said adhesive bonding said two plates and intermediate member together and sealing said liquid within said interior space.

2. A display apparatus as defined in claim 1, wherein the display apparatus is a liquid crystal type display apparatus, and the intermediate member is said adhesive.

3. A display apparatus as defined in claim 1, wherein the display apparatus is a bubble type display apparatus for use as an inclination angle measuring apparatus, said intermediate member is a container, and said adhesive is disposed between the plates and the container.

4. A display apparatus comprising two plates having a space defined therebetween and a liquid sealed in said space, said two plates being bonded together by an adhesive comprising a fluorocarbon resin of the formula:

wherein R is an alkyl group.

5. A method of making a display apparatus comprising:

bonding two plates together by means of an adhesive comprising a fluorocarbon resin with an interior space between said two plates, said fluorocarbon having the formula:

wherein R is an alkyl group; and charging a liquid into said interior space.

6. A method as defined in claim 5, further comprising evacuating said interior space and charging said liquid into the evacuated interior space.

7. A bubble type display apparatus including a container comprising a tube-like member having two open ends, a first member closing one open end of said container, a second member closing the other open end of said container, and a liquid with a bubble sealed within said container so that said bubble is movable in accordance with angle of inclination of said container, said container and said first and second members being bonded together by a fluorocarbon resin of the formula:

wherein R is an alkyl group.

8. A liquid crystal type display apparatus comprising:

two base plates equipped with electrodes with a gap formed between said two base plates;

means for bonding said two base plates together with an interior space corresponding to said gap defined therebetween; and a liquid crystal sealed in said interior space;

said bonding means comprising an adhesive comprising a fluorocarbon resin of the formula:

wherein R is an alkyl group.

* * * * *